(12) United States Patent
Huang

(10) Patent No.: US 7,774,901 B1
(45) Date of Patent: Aug. 17, 2010

(54) RETRACTABLE HANDLE ASSEMBLY FOR TOOL

(75) Inventor: Yao-Chung Huang, Changhua Hsien (TW)

(73) Assignee: Ho Cheng Garden Tools Co., Ltd., Changhua Hsien (TW)

( * ) Notice: Subject to any disclaimer, the term of this patent is extended or adjusted under 35 U.S.C. 154(b) by 428 days.

(21) Appl. No.: 11/950,687

(22) Filed: Dec. 5, 2007

(51) Int. Cl.
*B25G 1/04* (2006.01)

(52) U.S. Cl. ........................................ 16/429; 16/113.1

(58) Field of Classification Search .................. 16/429, 16/110.1, 113.1, 405, 427; 15/257.7; 81/317, 81/177.2, 489; 190/18 R, 18 A, 115, 116; 280/37; 30/340; 294/57, 58, 167, 168
See application file for complete search history.

(56) References Cited

U.S. PATENT DOCUMENTS 5,729,865 A * 3/1998 Stoddart ...................... 16/429
5,931,065 A * 8/1999 Jackson et al. ............. 81/177.2
6,038,946 A * 3/2000 Jackson et al. ............. 81/177.2
6,370,990 B1 * 4/2002 Lin ........................... 81/177.2
6,883,208 B1 * 4/2005 Huang ......................... 16/429
7,347,123 B1 * 3/2008 Toole et al. .................... 81/20
2003/0079950 A1 * 5/2003 Lin et al. ...................... 190/115

* cited by examiner

*Primary Examiner*—Victor Batson
*Assistant Examiner*—Jeffrey O'Brien
(74) *Attorney, Agent, or Firm*—Alan Kamrath; Kamrath & Associates PA

(57) ABSTRACT

A retractable handle assembly includes an outer pipe, an inner pipe, an outer mounting sleeve, a control seat, a positioning post, a movable pin, a control knob, and a link. Thus, the positioning post extends through the through bore of the outer mounting sleeve and is inserted into one of the two positioning holes of the inner pipe to lock the inner pipe onto the outer pipe, so that the inner pipe and the outer pipe are combined solidly and stably to bear a greater load, thereby enhancing the strength of the retractable handle assembly. In addition, the inner pipe and the outer pipe are not in frictional contact to prevent from incurring jam between the inner pipe and the outer pipe, thereby enhancing the lifetime of the retractable handle assembly.

18 Claims, 7 Drawing Sheets

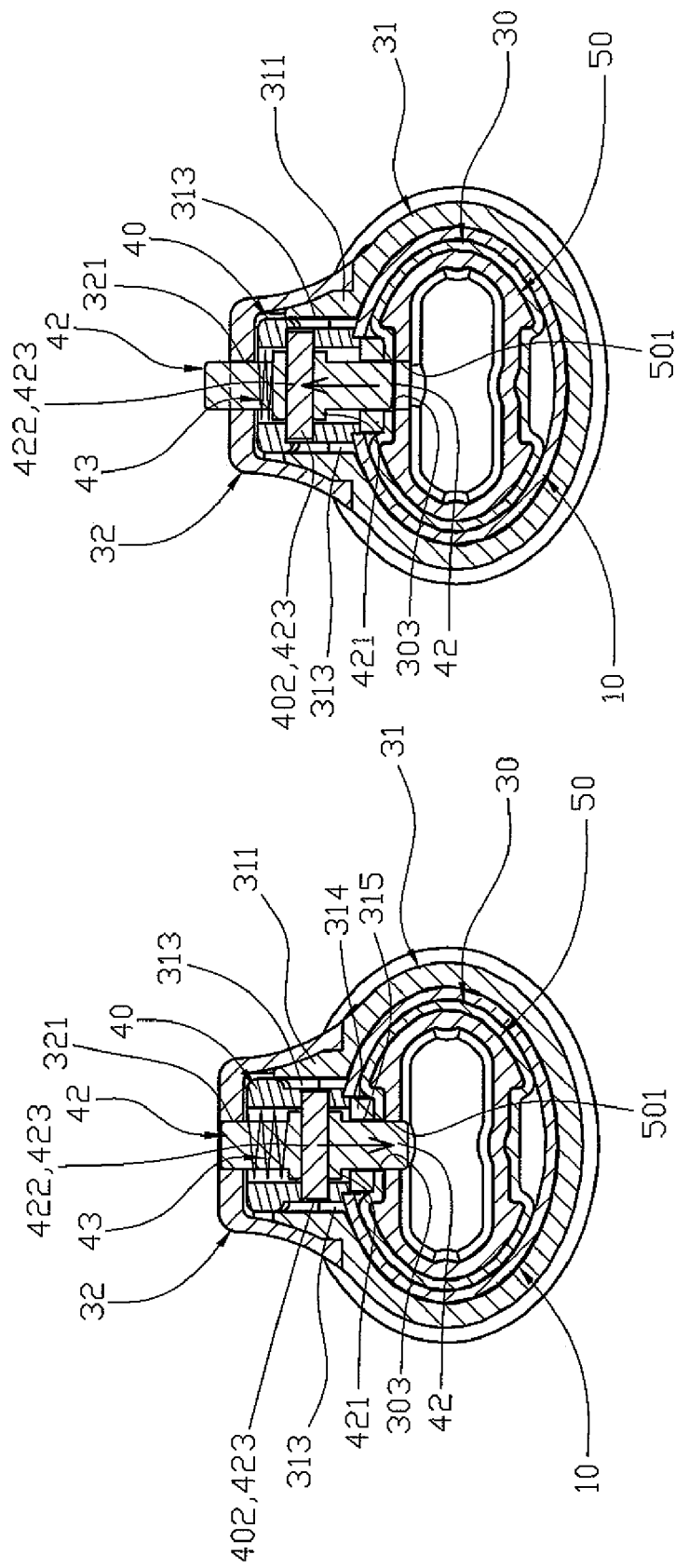

RETRACTABLE HANDLE ASSEMBLY FOR TOOL

BACKGROUND OF THE INVENTION

1. Field of the Invention

The present invention relates to a retractable handle assembly and, more particularly, to a retractable handle assembly for a tool, such as a pair of shears for gardening use.

2. Description of the Related Art

A conventional retractable handle assembly comprises an outer pipe and an inner pipe retractably mounted on the outer pipe. The inner pipe has an end portion provided with an eccentric or expandable mechanism. Thus, when the inner pipe is rotatable relative to the outer pipe, the eccentric or expandable mechanism is locked onto the inner wall of the outer pipe, thereby locking the inner pipe onto the outer pipe. However, the inner pipe is rotatable relative to the outer pipe to rub the outer pipe frequently, so that the inner pipe is easily worn out and loosened from the outer pipe during a long-term utilization, thereby decreasing the lifetime of retractable handle assembly. In addition, the inner pipe is locked onto the outer pipe by a frictional fit manner, so that a jam easily produces between the inner pipe and the outer pipe due to an excessive rotation of the inner pipe relative to the outer pipe. Further, the inner pipe is locked onto the outer pipe by a frictional fit manner, so that the inner pipe and the outer pipe are not combined solidly and cannot bear a larger axial force or a heavier load.

BRIEF SUMMARY OF THE INVENTION

The primary objective of the present invention is to provide a retractable handle assembly having an adjustable length.

Another objective of the present invention is to provide a retractable handle assembly, wherein the first end of the positioning post in turn extends through the through bore of the outer mounting sleeve and the through hole of the inner mounting sleeve and is inserted into one of the two positioning holes of the inner pipe to lock the inner pipe onto the outer pipe, so that the inner pipe and the outer pipe are combined solidly and stably to bear a greater load, thereby enhancing the strength of the retractable handle assembly.

A further objective of the present invention is to provide a retractable handle assembly, wherein the inner pipe and the outer pipe are not in frictional contact with each other to prevent from incurring jam between the inner pipe and the outer pipe, thereby enhancing the lifetime of the retractable handle assembly.

A further objective of the present invention is to provide a retractable handle assembly, wherein the inner pipe is unlocked from the outer pipe by pushing the drive portion of the control knob so that the inner pipe is movable relative to the outer pipe to adjust the distance between the inner pipe and the outer pipe, and the retractable handle assembly is operated to adjust its length easily and quickly, thereby facilitating a user adjusting the length of the retractable handle assembly.

Further benefits and advantages of the present invention will become apparent after a careful reading of the detailed description with appropriate reference to the accompanying drawings.

BRIEF DESCRIPTION OF THE SEVERAL VIEWS OF THE DRAWING(S)

FIG. 5 is a side cross-sectional view of the retractable handle assembly taken along line 5-5 as shown in FIG. 1.

FIG. 7 is a schematic operational view of the retractable handle assembly as shown in FIG. 5.

DETAILED DESCRIPTION OF THE INVENTION

Figure 1:
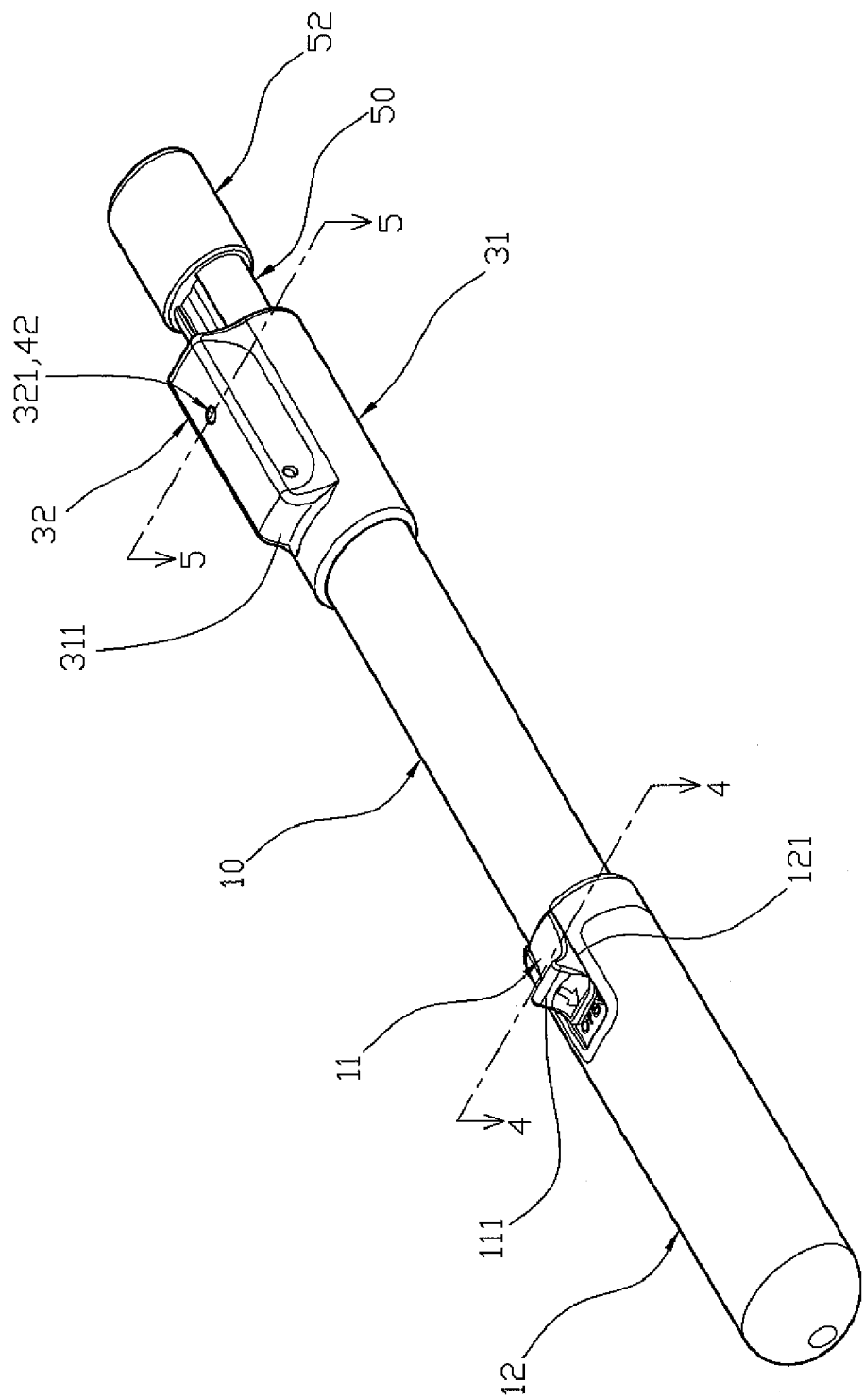
FIG. 1 is a perspective view of a retractable handle assembly in accordance with the preferred embodiment of the present invention.
Figure 2:
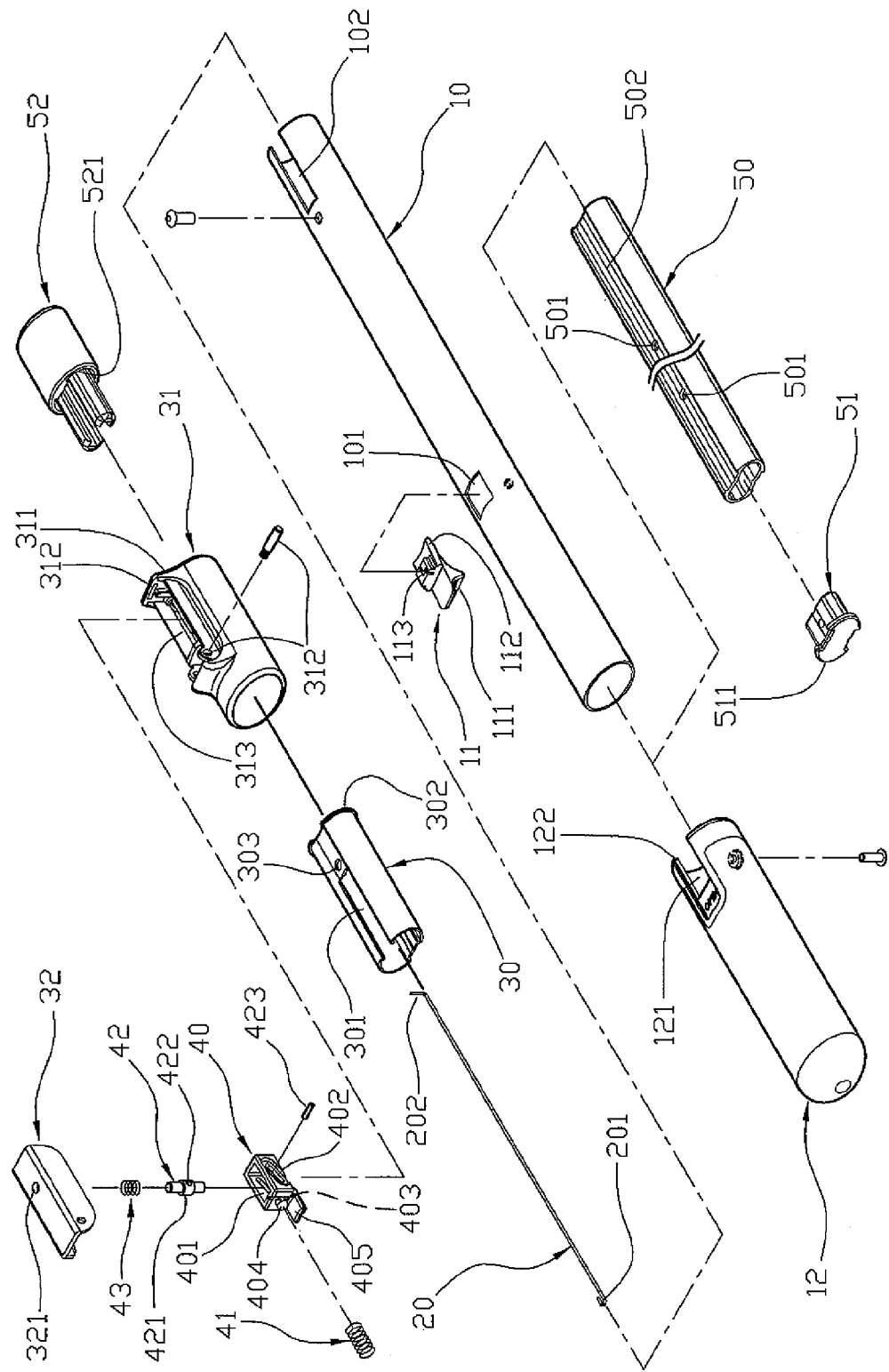
FIG. 2 is an exploded perspective view of the retractable handle assembly as shown in FIG. 1.
Figure 4:
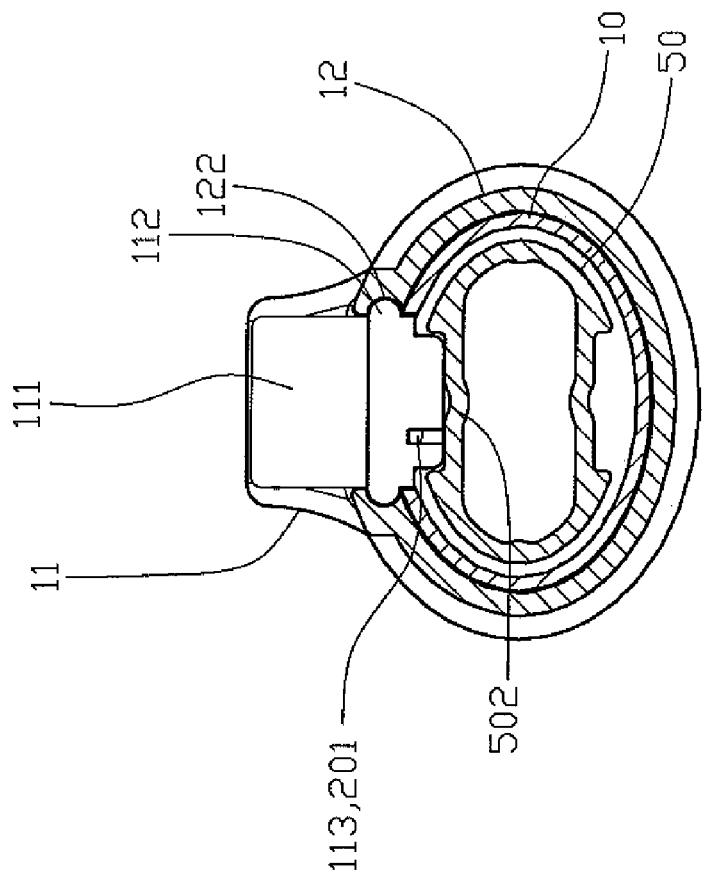
FIG. 4 is a side cross-sectional view of the retractable handle assembly taken along line 4-4 as shown in FIG. 1.
Figure 3:
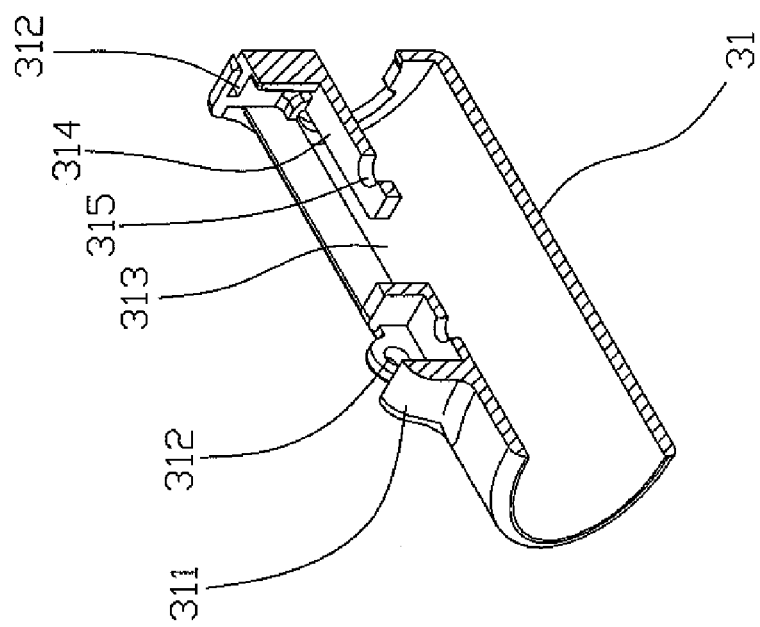
FIG. 3 is a perspective cross-sectional view of an outer mounting sleeve of the retractable handle assembly as shown in FIG. 2.
Figure 6:
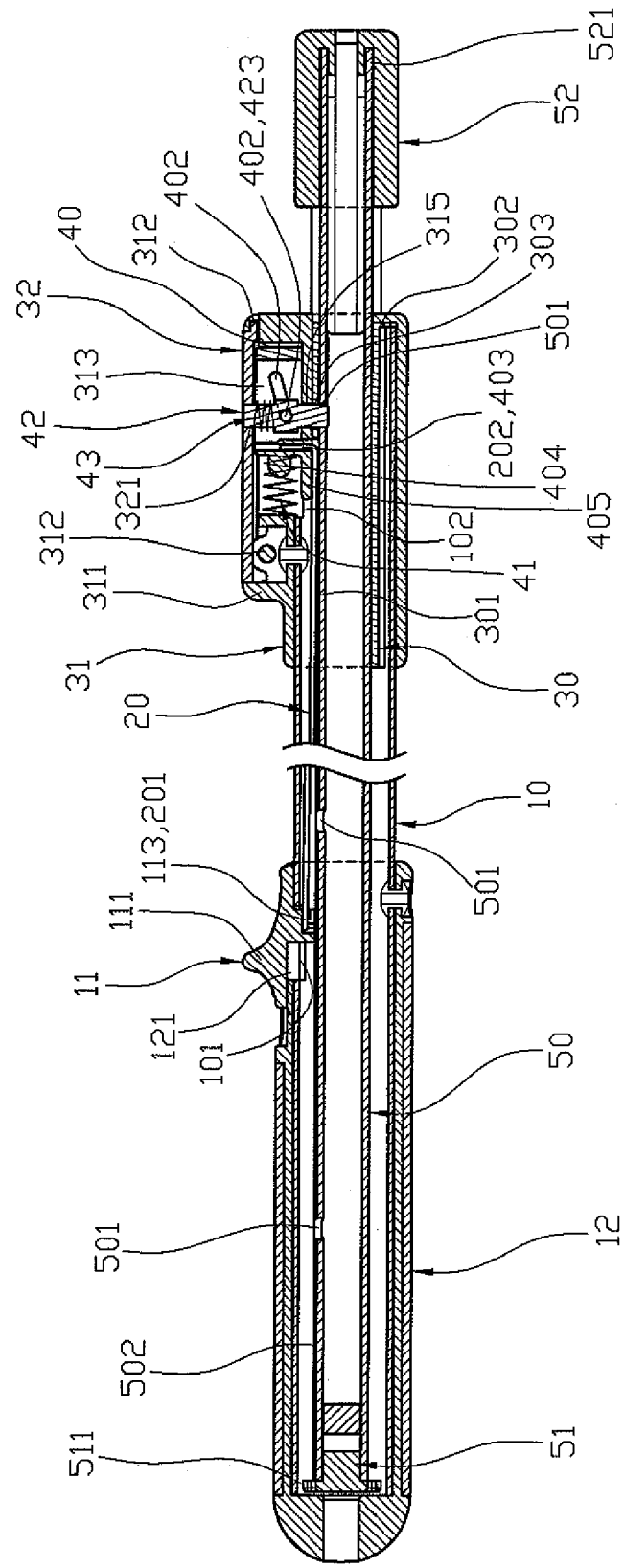
FIG. 6 is a front cross-sectional view of the retractable handle assembly as shown in FIG. 1.

Referring to the drawings and initially to FIGS. 1-6, a retractable handle assembly in accordance with the preferred embodiment of the present invention comprises an outer pipe 10, an inner pipe 50 movably mounted in the outer pipe 10 and having a face provided with two positioning holes 501, an outer mounting sleeve 31 mounted on a first end of the outer pipe 10, a control seat 40 movably mounted on the outer mounting sleeve 31 and having an inside provided with a receiving space 401 and two opposite side walls each provided with an oblique guide slot 402, a positioning post 42 movably mounted in the receiving space 401 of the control seat 40 and having a first end extending through the outer mounting sleeve 31 and the outer pipe 10 and detachably inserted into one of the two positioning holes 501 of the inner pipe 50, a movable pin 423 slidably mounted in the guide slots 402 of the two opposite side walls of the control seat 40 and extending through the positioning post 42 to move the positioning post 42 relative to the inner pipe 50 by movement of the control seat 40 relative to the outer mounting sleeve 31, a control knob 11 movably mounted on a second end of the outer pipe 10, a link 20 received in the outer pipe 10 and connected between the control knob 11 and the control seat 40 to move the control seat 40 relative to the outer mounting sleeve 31, a jacket 12 mounted on the second end of the outer pipe 10 to limit the control knob 11, a plug 52 mounted on a first end of the inner pipe 50 and protruding outwardly from the outer pipe 10, and an end cap 51 mounted on a second end of the inner pipe 50 and received in the outer pipe 10.

The outer pipe 10 has a substantially oblong cross-sectional profile. The first end of the outer pipe 10 has a face provided with an elongate opening 102 to allow passage of the first end of the positioning post 42, and the second end of the outer pipe 10 has a face provided with an elongate slot 101 to receive the control knob 11.

The jacket 12 has a substantially oblong cross-sectional profile and has an end portion provided with an elongate slideway 121 connected to the elongate slot 101 of the outer pipe 10 to allow movement of the control knob 11. The slideway 121 of the jacket 12 has two opposite sides each provided with a limit groove 122.

The control knob 11 has a first side provided with a drive portion 111 protruding from the outer pipe 10 and a second side provided with an engaging portion 113 extending through the elongate slot 101 of the outer pipe 10. The control knob 11 has two opposite sides each provided with a slide 112 slidable in the respective limit groove 122 of the jacket 12.

The retractable handle assembly further comprises an inner mounting sleeve 30 mounted in the first end of the outer pipe 10, and the inner pipe 50 is movable in the inner mounting sleeve 30. The inner mounting sleeve 30 has a substantially oblong cross-sectional profile and has a first end provided with an elongate channel 301 aligning with the opening 102 of the outer pipe 10, a second end provided with a protruding stop flange 302 abutting the first end of the outer pipe 10 and a mediate portion provided with a through hole 303 located between the channel 301 and the stop flange 302 to allow passage of the first end of the positioning post 42.

The outer mounting sleeve 31 has a peripheral wall provided with a protruding mounting seat 311 for mounting the control seat 40. The mounting seat 311 of the outer mounting sleeve 31 has an inside provided with a sliding slot 313 connected to the opening 102 of the outer pipe 10 to allow movement of the control seat 40 and has an end wall provided with an elongate support plate 314 extending into the sliding slot 313 to support the control seat 40. The support plate 314 of the outer mounting sleeve 31 is provided with a through bore 315 to allow passage of the first end of the positioning post 42.

The retractable handle assembly further comprises a lid 32 mounted on the mounting seat 311 of the outer mounting sleeve 31 by a connecting mechanism 312, a first spring 41 biased between the mounting seat 311 of the outer mounting sleeve 31 and the control seat 40 to push the control seat 40 toward the first end of the outer pipe 10, to move the movable pin 423 downward in the guide slots 402 of the two opposite side walls of the control seat 40 and to move the positioning post 42 toward the inner pipe 50, and a second spring 43 biased between the lid 32 and the positioning post 42 to push the positioning post 42 toward the inner pipe 50. The lid 32 is provided with an aperture 321.

The positioning post 42 has a second end extending through the second spring 43 and movably mounted in the aperture 321 of the lid 32. The positioning post 42 has a middle portion located between the first end and the second end and provided with a protruding resting shoulder 421 abutting the second spring 43 and a fixing hole 422 to allow passage of the movable pin 423. The first end of the positioning post 42 in turn extends through the control seat 40, the through bore 315 of the outer mounting sleeve 31, the opening 102 of the outer pipe 10 and the through hole 303 of the inner mounting sleeve 30 and is inserted into one of the two positioning holes 501 of the inner pipe 50, thereby locking the inner pipe 50 onto the outer pipe 10.

The control seat 40 has an end face provided with a mounting stub 404 for mounting the first spring 41 and has an inner wall provided with an engaging section 403. The control seat 40 has a bottom provided with a protruding limit plate 405 located between the sliding slot 313 of the outer mounting sleeve 31, the outer pipe 10 and the inner pipe 50 and slidable in the opening 102 of the outer pipe 10.

The link 20 has a first end provided with a snapping portion 201 snapped into the engaging portion 113 of the control knob 11 to connect the link 20 to the control knob 11 and a second end provided with a snapping section 202 snapped into the engaging section 403 of the control seat 40 to connect the link 20 to the control seat 40.

The plug 52 has an end portion provided with a protruding locking portion 521 inserted into the first end of the inner pipe 50. The end cap 51 has an end portion provided with a protruding stop edge 511 abutting the second end of the inner pipe 50.

The inner pipe 50 has a substantially oblong cross-sectional profile and is provided with an axially extending limit channel 502 connected to the two positioning holes 501 of the inner pipe 50, and the positioning post 42 is movable in the limit channel 502 of the inner pipe 50 when the positioning post 42 is detached from the two positioning holes 501 of the inner pipe 50, and when the inner pipe 50 is movable relative to the outer pipe 10.

Figure 8:
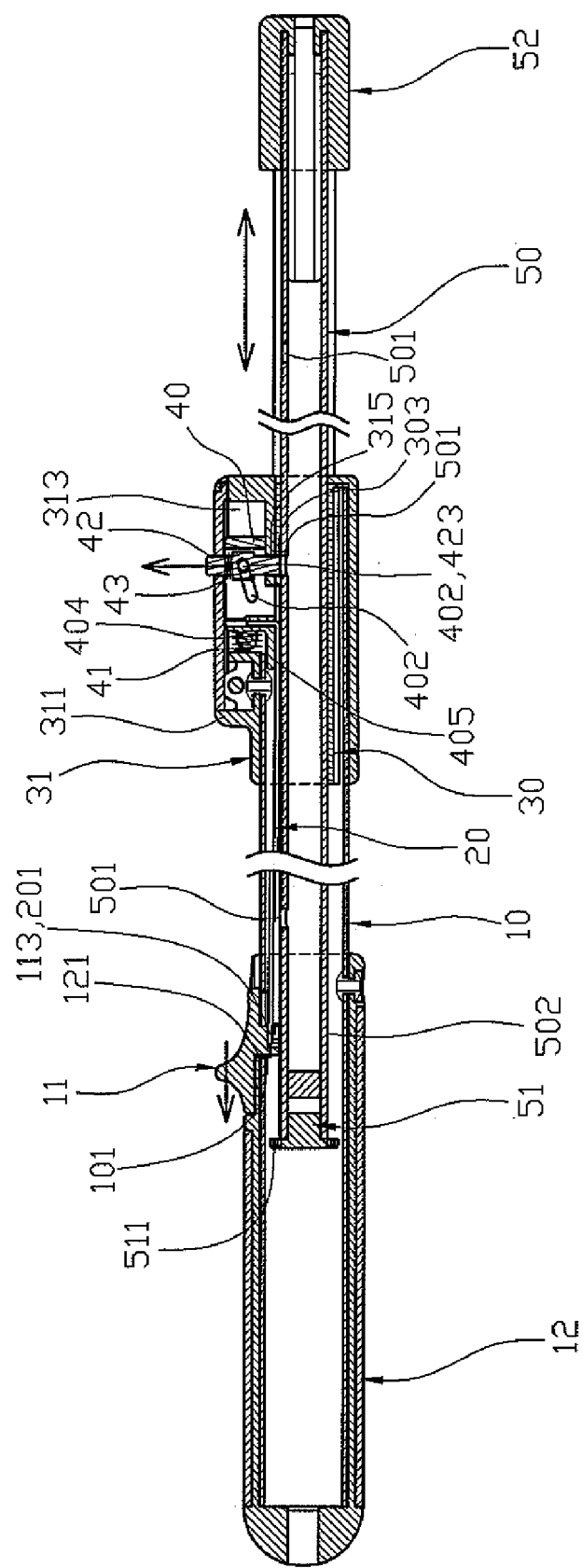
FIG. 8 is a schematic operational view of the retractable handle assembly as shown in FIG. 6.

In operation, referring to FIGS. 7 and 8 with reference to FIGS. 1-6, the drive portion 111 of the control knob 11 is movable outwardly relative to the outer mounting sleeve 31 to move the link 20 which drives the control seat 40 to move outwardly relative to the first end of the outer pipe 10 and to compress the first spring 41. At this time, the positioning post 42 is limited by the through bore 315 of the outer mounting sleeve 31 and the through hole 303 of the inner mounting sleeve 30 so that the positioning post 42 is not movable with the control seat 40. In such a manner, when the control seat 40 is movable outwardly relative to the first end of the outer pipe 10, the movable pin 423 is movable upward in the guide slots 402 of the two opposite side walls of the control seat 40 to move the positioning post 42 outwardly relative to the inner pipe 50, so that the first end of the positioning post 42 is detached from one of the two positioning holes 501 of the inner pipe 50 as shown in FIGS. 7 and 8 so as to unlock the inner pipe 50 from the outer pipe 10. Thus, the inner pipe 50 is movable freely relative to the outer pipe 10, and the positioning post 42 is movable in the limit channel 502 of the inner pipe 50. At this time, the positioning post 42 is movable toward the lid 32 to compress the second spring 43, and the second end of the positioning post 42 protrudes outwardly from the aperture 321 of the lid 32.

After the first end of the positioning post 42 aligns with the other one of the two positioning holes 501 of the inner pipe 50, the positioning post 42 is movable toward the inner pipe 50 by the restoring force of the first spring 41 and the second spring 43, so that the first end of the positioning post 42 is inserted into the other one of the two positioning holes 501 of the inner pipe 50, thereby locking the inner pipe 50 onto the outer pipe 10 again.

Figure 9:
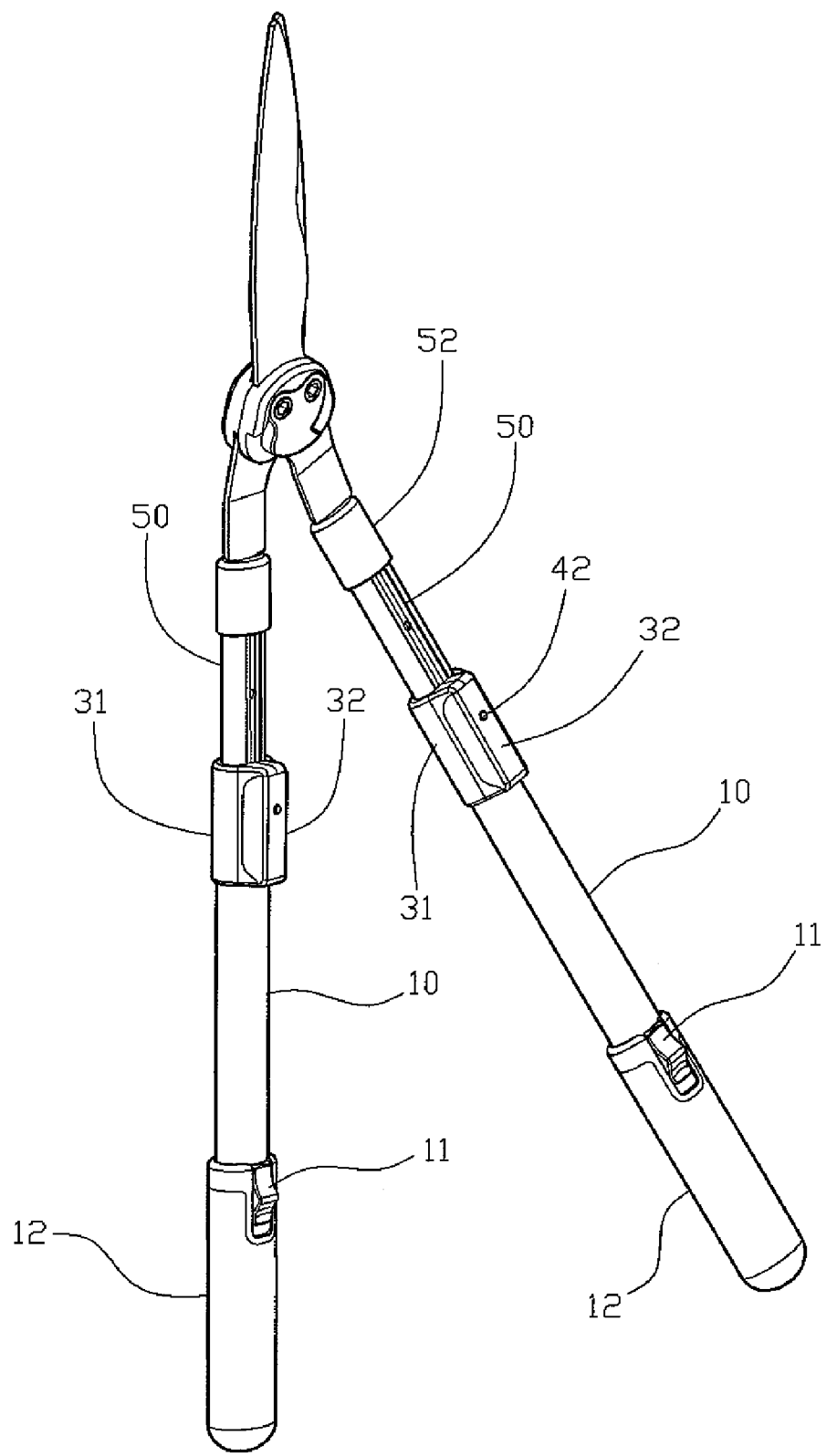
FIG. 9 is a perspective view of the retractable handle assembly for a pair of shears in accordance with the preferred embodiment of the present invention.

Referring to FIG. 9, the retractable handle assembly is available for a tool, such as a pair of shears for gardening use.

Accordingly, the first end of the positioning post 42 in turn extends through the through bore 315 of the outer mounting sleeve 31 and the through hole 303 of the inner mounting sleeve 30 and is inserted into one of the two positioning holes 501 of the inner pipe 50 to lock the inner pipe 50 onto the outer pipe 10, so that the inner pipe 50 and the outer pipe 10 are combined solidly and stably to bear a greater load, thereby enhancing the strength of the retractable handle assembly. In addition, the inner pipe 50 and the outer pipe 10 are not in frictional contact with each other to prevent from incurring jam between the inner pipe 50 and the outer pipe 10, thereby enhancing the lifetime of the retractable handle assembly. Further, the inner pipe 50 is unlocked from the outer pipe 10 by pushing the drive portion 111 of the control knob 11 so that the inner pipe 50 is movable relative to the outer pipe 10 to adjust the distance between the inner pipe 50 and the outer pipe 10, and the retractable handle assembly is operated to adjust its length easily and quickly, thereby facilitating a user adjusting the length of the retractable handle assembly.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

The invention claimed is:

1. A retractable handle assembly, comprising:
an outer pipe;
an inner pipe movably mounted in the outer pipe and having a face provided with two positioning holes;
an outer mounting sleeve mounted on a first end of the outer pipe; a control seat movably mounted on the outer mounting sleeve and having an inside provided with a receiving space and two opposite side walls each provided with an oblique guide slot;
a positioning post movably mounted in the receiving space of the control seat and having a first end extending through the outer mounting sleeve and the outer pipe and detachably inserted into one of the two positioning holes of the inner pipe;
a movable pin slidably mounted in the guide slots of the two opposite side walls of the control seat and extending through the positioning post to move the positioning post relative to the inner pipe by movement of the control seat relative to the outer mounting sleeve;
a control knob movably mounted on a second end of the outer pipe;
a link received in the outer pipe and connected between the control knob and the control seat to move the control seat relative to the outer mounting sleeve;
wherein the outer mounting sleeve has a peripheral wall provided with a protruding mounting seat for mounting the control seat;
a lid mounted on the mounting seat of the outer mounting sleeve;
a first spring biased between the mounting seat of the outer mounting sleeve and the control seat to push the control seat toward the first end of the outer pipe, to move the movable pin downward in the guide slots of the two opposite side walls of the control seat and to move the positioning post toward the inner pipe; and
a second spring biased between the lid and the positioning post to push the positioning post toward the inner pipe.

2. The retractable handle assembly in accordance with claim 1, wherein
the second end of the outer pipe has a face provided with an elongate slot to receive the control knob;
the control knob has a first side provided with a drive portion protruding from the outer pipe and a second side provided with an engaging portion extending through the elongate slot of the outer pipe;
the control seat has an inner wall provided with an engaging section;
the link has a first end provided with a snapping portion snapped into the engaging portion of the control knob to connect the link to the control knob and a second end provided with a snapping section snapped into the engaging section of the control seat to connect the link to the control seat.

3. The retractable handle assembly in accordance with claim 1, wherein the lid is mounted on the mounting seat of the outer mounting sleeve by a connecting mechanism.

4. The retractable handle assembly in accordance with claim 1, wherein
the lid is provided with an aperture;
the positioning post has a second end extending through the second spring and movably mounted in the aperture of the lid;
the positioning post has a middle portion located between the first end and the second end and provided with a protruding resting shoulder abutting the second spring.

5. The retractable handle assembly in accordance with claim 4, wherein the middle portion of the positioning post is provided with a fixing hole to allow passage of the movable pin.

6. The retractable handle assembly in accordance with claim 1, wherein
the first end of the outer pipe has a face provided with an elongate opening to allow passage of the first end of the positioning post;
the mounting seat of the outer mounting sleeve has an inside provided with a sliding slot connected to the opening of the outer pipe to allow movement of the control seat and has an end wall provided with an elongate support plate extending into the sliding slot to support the control seat.

7. The retractable handle assembly in accordance with claim 6, further comprising
an inner mounting sleeve mounted in the first end of the outer pipe; wherein
the inner mounting sleeve has a first end provided with an elongate channel aligning with the opening of the outer pipe, a second end provided with a protruding stop flange abutting the first end of the outer pipe and a mediate portion provided with a through hole located between the channel and the stop flange to allow passage of the first end of the positioning post;
the support plate of the outer mounting sleeve is provided with a through bore to allow passage of the first end of the positioning post;
the first end of the positioning post in turn extends through the control seat, the through bore of the outer mounting sleeve, the opening of the outer pipe and the through hole of the inner mounting sleeve and is inserted into one of the two positioning holes of the inner pipe, thereby locking the inner pipe onto the outer pipe.

8. The retractable handle assembly in accordance with claim 7, wherein the inner pipe is movable in the inner mounting sleeve.

9. The retractable handle assembly in accordance with claim 6, wherein the control seat has a bottom provided with a protruding limit plate located between the sliding slot of the outer mounting sleeve, the outer pipe and the inner pipe and slidable in the opening of the outer pipe.

10. The retractable handle assembly in accordance with claim 1, wherein the control seat has an end face provided with a mounting stub for mounting the first spring.

11. The retractable handle assembly in accordance with claim 2, further comprising
a jacket mounted on the second end of the outer pipe to limit the control knob; wherein
the jacket has an end portion provided with an elongate slideway connected to the elongate slot of the outer pipe to allow movement of the control knob;
the slideway of the jacket has two opposite sides each provided with a limit groove;
the control knob has two opposite sides each provided with a slide slidable in the respective limit groove of the jacket.

12. The retractable handle assembly in accordance with claim 1, wherein
the inner pipe is provided with an axially extending limit channel connected to the two positioning holes of the inner pipe;

the positioning post is movable in the limit channel of the inner pipe when the positioning post is detached from the two positioning holes of the inner pipe, and when the inner pipe is movable relative to the outer pipe.

13. The retractable handle assembly in accordance with claim 1, further comprising a plug mounted on a first end of the inner pipe and protruding outwardly from the outer pipe;

an end cap mounted on a second end of the inner pipe and received in the outer pipe.

14. The retractable handle assembly in accordance with claim 13, wherein the plug has an end portion provided with a protruding locking portion inserted into the first end of the inner pipe;

the end cap has an end portion provided with a protruding stop edge abutting the second end of the inner pipe.

15. The retractable handle assembly in accordance with claim 1, wherein the control knob is movable outwardly relative to the outer mounting sleeve to move the link which drives the control seat to move outwardly relative to the first end of the outer pipe and to compress the first spring;

the movable pin is movable upward in the guide slots of the two opposite side walls of the control seat to move the positioning post outwardly relative to the inner pipe and to detach the first end of the positioning post from one of the two positioning holes of the inner pipe so as to unlock the inner pipe from the outer pipe.

16. The retractable handle assembly in accordance with claim 1, wherein the outer pipe has a substantially oblong cross-sectional profile;

the inner pipe has a substantially oblong cross-sectional profile.

17. The retractable handle assembly in accordance with claim 7, wherein the inner mounting sleeve has a substantially oblong cross-sectional profile.

18. The retractable handle assembly in accordance with claim 11, wherein the jacket has a substantially oblong cross-sectional profile.

* * * * *